United States Patent
Ziefle

[11] 3,903,976
[45] Sept. 9, 1975

[54] MECHANICAL SCALE AND METHOD OF CALIBRATING THE SAME

[75] Inventor: Martin Ziefle, Balingen, Wurttemberg, Germany

[73] Assignee: Bizerba-Werke Wilhelm Kraut KG, Balingen, Wurttemberg, Germany

[22] Filed: Oct. 4, 1973

[21] Appl. No.: 403,606

[30] Foreign Application Priority Data
Oct. 12, 1972 Germany............................ 2250008

[52] U.S. Cl.............................. 177/164; 177/260
[51] Int. Cl.² ........................................ G01G 23/14
[58] Field of Search............ 177/179, 180, 190–200, 177/238, 243, 244, 246, 255, 260, 264, 164–172

[56] References Cited
UNITED STATES PATENTS

| | | | |
|---|---|---|---|
| 2,097,026 | 10/1937 | Flanagan | 177/193 |
| 3,185,235 | 5/1965 | Mittelsteadt | 177/264 |
| 3,193,030 | 7/1965 | Meier | 177/260 |
| 3,522,857 | 8/1970 | Ast | 177/208 |

FOREIGN PATENTS OR APPLICATIONS

| | | | |
|---|---|---|---|
| 170,457 | 2/1960 | Sweden | 177/244 |
| 639,007 | 11/1936 | Germany | 177/190 |

*Primary Examiner*—Stephen J. Tomsky
*Assistant Examiner*—Vit N. Miska
*Attorney, Agent, or Firm*—Michael S. Striker

[57] ABSTRACT

A method of calibrating a mechanical scale to compensate for gravity-caused balance errors is disclosed, and an arrangement for carrying out the method. A balance lever of the scale is fulcrumed on a support, and one arm of the balance lever is to have a load to be weighed connected to it, whereas a spring is connected to the other arm to counter the load. The center of mass of the balance lever is shifted to this other arm, and the support is inclined in the plane of movement of the balance lever with reference to the horizontal, until a gravity-caused balance error is compensated.

7 Claims, 3 Drawing Figures

MECHANICAL SCALE AND METHOD OF CALIBRATING THE SAME

BACKGROUND OF THE INVENTION

The present invention relates generally to scales, and more particularly to mechanical scales. Still more particularly the present invention relates to a method of calibrating a spring-loaded mechanical scale to compensate for gravity-caused balance errors, and to an arrangement for carrying out the method.

Spring-loaded mechanical scales depend upon a spring which is connected to one arm of a fulcrumed balance lever, to counteract the weight of a load which is connected with the other arm, and is thus to be weighed. The weight of the load dictates the extent to which the spring is deflected, so that this deflection is an indicator of the weight.

This type of scale is, however, influenced by gravitational acceleration which can induce errors in the weight indication of such a scale. Gravitational acceleration is different at different locations, and therefore a scale of the type in question which provides a proper weight indication at one location will, when removed to another location which is far enough distant, provide a weight indication which includes an error caused by the different gravitational effects at this other location. This means that spring-loaded scales must be calibrated whenever they are so moved. This is, of course, well known and the prior art has provided a calibrating arrangement in form of a balance weight which is connected to a fulcrumed balance lever of the scale and which can be raised or lowered to provide a compensation for the aforementioned error. Another proposal is to use an auxiliary spring the spring force of which passes through the fulcrum of the balance lever when the latter is in zero position, and which increases the more the lever is tilted out of zero position. The compensation is effected by changing the prestress of this auxiliary spring. Both of these prior-art proposals are effective for their intended purpose. However, in both cases it is necessary —when making adjustments to compensate for movement of the scale from one location to another where the gravitational acceleration effect is different— to perform manipulations which directly affect the balancing components of the scale. For certain reasons, for instance because such manipulations can interfere with the calibration of the scale, this is undesirable.

SUMMARY OF THE INVENTION

Accordingly, it is an object of the present invention to overcome the aforementioned drawback of the prior art.

More particularly, it is an object of the present invention to provide an improved method of calibrating a spring-loaded mechanical scale to compensate for gravity-caused balance errors, without having to actually interfere with the balance system of the scale.

An additional object of the invention is to provide an improved scale having an arrangement for carrying out the method.

In keeping with the above objects, and with others which will become apparent hereafter, one feature of the invention resides, in a method of calibrating a mechanical scale to compensate for gravity-caused balance errors, in the steps of fulcruming on a support a balance lever to one arm of which loads to be weighed are to be connected. The other arm of the lever is spring-loaded in order to counter these loads. The center of mass of the balance lever is shifted to this other arm, and the support is inclined in the plane of movement of the balance lever with reference to the horizontal, until a gravity-caused balance error is compensated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
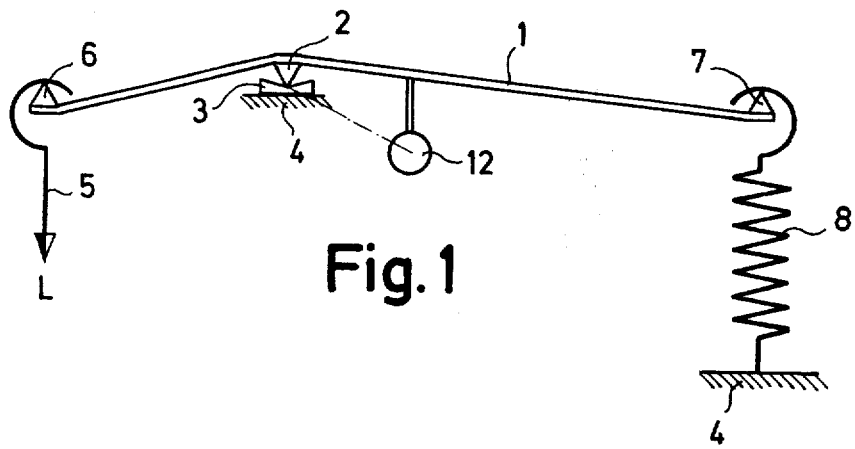
FIG. 1 is a diagrammatic view illustrating the principle of a spring-loaded mechanical scale which is to be calibrated according to the present invention.

Referring firstly to FIG. 1, which is merely diagrammatic and shows only those components which are necessary for an understanding of the present invention, it will be seen that reference numeral 1 identifies a balance lever which is fulcrumed on a diagrammatically shown support 4, in that a knife edge balance 2 on the lever 1 is tiltably received in a seat 3. The latter is, as shown, mounted on the support 4 which in conventional manner can be the frame of the scale. The left-hand arm (in FIG. 1) of the thus fulcrumed balance lever 1 is provided with a further knife edge balance 6, to which a diagrammatically illustrated hanger 5 is connected, for instance a tray or the like on which a load L is to be placed so that the load can be weighed. Again it is emphasized that this is shown only diagrammatically.

The other arm of the balance lever 1, namely the right-hand arm thereof, is also provided with a knife edge balance 7 to which a spring 8 is connected at one end thereof, the other end of which spring is fixedly secured to the support 4.

This construction is entirely conventional and it will be recalled that when a load L acts upon the element 5, the lever 1 pivots about the knife edge 2 towards the left in counterclockwise direction, stressing the spring 8. The angle through which the lever 1 is so pivoted against the force of the spring 8, is an indication of the weight of the load L.

In the embodiment of FIG. 1 there is provided a mass 12 which is rigid with the right-hand arm of the lever 1, being offset towards the right from the pivot axis or fulcrum of the balance lever 1 and being located downwardly of the fulcrum. This causes the center of mass of the balance lever 1 to be shifted towards the right from the fulcrum, which means that if the support 4 is inclined in the plane in which the balance lever 1 can pivot about its fulcrum, measuring errors will occur, that is the weight which is indicated on the conventional dial (not shown) associated with such scales will be either too large or too small.

The present invention utilizes this factor, that is the occurrence of such measuring errors under these circumstances, to compensate for the indicating errors caused by different gravitational forces acting upon the load but not influencing the spring force. The extent to which the support 4 has to be inclined is so small that it is not evident to the eye, but it is significantly greater than the responsiveness of a conventional bubble level or spirit level, so that such a level can be used for controlling the extent of the inclination. The inclination itself can be effected in conventional manner, for instance by using a shim under the support 4, or more advantageously by raising or lowering adjustable screw legs which are provided on most scales of this type.

Figure 2:
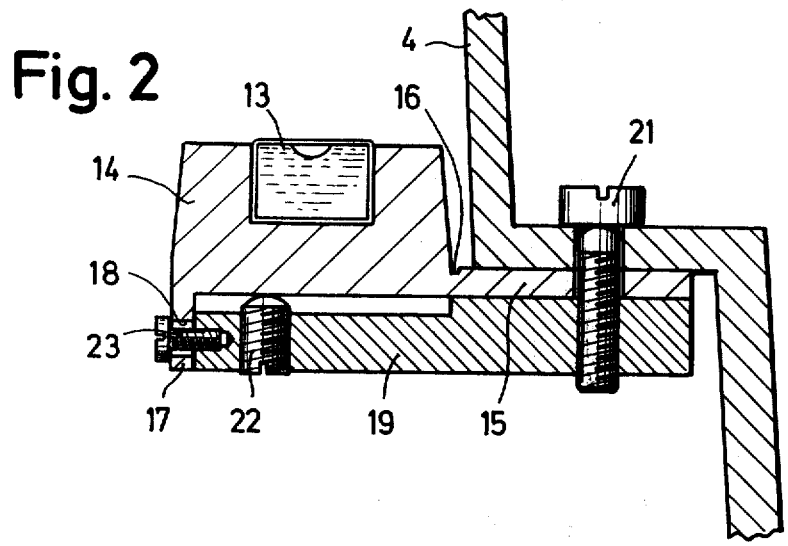
FIG. 2 is a fragmentary detail view, in vertical section, illustrating a construction of detail of the present invention.

FIG. 2 shows an arrangement for controlling the degree of inclination which is necessary to obtain the desired compensation for gravity-caused balance errors. In this embodiment a circular bubble level 13 is mounted on a holder 14 which in turn is elastically yieldably connected with a laterally extending mounting portion 15 in such a manner that the holder 14 and the portion 15 assume a predetermined orientation relative to one another. The simplest possibility for such an elastically yieldable connection is to provide the holder 14 and the portion 15 of one piece and to form them with a weakened zone 16 along which they can elastically flex with reference to one another.

A downward projection 17 of the holder 14 is provided with a vertically extending slot 18, the purpose of which will be discussed subsequently.

A plate 19 is located beneath the holder 14 and the portion 15 to support both of them, and a screw or bolt 21 connects the portion 15 and the plate 19 to the support 4, that is the frame or base of the scale. As pointed out earlier, this support 4 can be inclined in the plane in which the lever 1 can pivot in FIG. 1, that is in the plane of FIGS. 1 and 2. In other words, the support 4 can be tilted in clockwise direction or in counterclockwise direction in the plane of FIGS. 1 and 2.

A set screw 22 is threaded from below through the plate 19 and presses with its leading end against the underside of the holder 14 which carries the level 13. Therefore, depending upon the extent to which the set screw 22 is threaded into the plate 19, the holder 14 and with it the level 13 will be pushed up in FIG. 2, flexing in clockwise direction about the weakened zone 16 and thus becoming inclined with reference to the support 4. A screw 23 is threaded through the slot 18 into the plate 19; it is loosened before the just-described adjustment of the holder 14 is carried out via the set screw 22, and the screw 23 is subsequently tightened when the adjustment is completed so as to maintain the holder 14 in the selected position.

The operation of the arrangement in FIG. 2 to compensate for gravity-caused balance errors will already be clear. The first step is to incline the support 4 in clockwise or counterclockwise direction in the plane of FIGS. 1 and 2 until a gravity-caused balance error is compensated for. The error will first be observed by applying a load having a known weight to the left-hand arm of the balance lever 1 (see FIG. 1), and observing the dial associated with the scale. Depending upon the particular gravity-caused balance error, this dial will show either a greater weight or a lesser weight than the actual weight of the load. The support 4 is then inclined until the dial indicates the actual weight of the load, at which time compensation for the gravity-caused balance error has taken place. Thereupon, the screw 23 is loosened and the screw 22 is used to adjust the holder 14 to such an extent that the level 13 (whose bubble has moved off center position during the inclination of the support 4) will again indicate horizontality, that is the bubble will return to center position. The screw 23 is thereupon tightened again to fix the holder 14 in this position. If subsequently a renewed adjustment or calibrating of the scale becomes necessary, it is merely required that the support 4 be further inclined until the level 13 again indicates an (apparent) state of horizontality.

Figure 3:
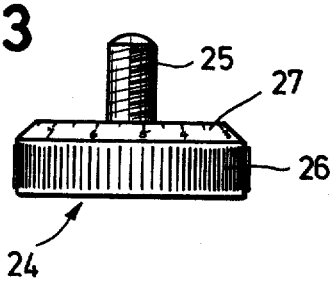
FIG. 3 is a side view illustrating a detail of a component to be used with the arrangement in FIG. 2.

As FIG. 3 shows, it is possible to provide a screw 24 having a shaft 25 which can be threaded into the plate 19 in place of the set screw 22, to perform the function of the same. The screw 24 has a head 26 provided with a scale 27 which can cooperate with a marking (not shown) provided on the plate 19. The scale 27 is calibrated in units of gravitational error. This makes it possible to pre-adjust the scale at the manufacturing plant by inclining the support and the level 13 to such an extent that at the time of manufacture the gravity-caused balance error at the location where the scale is later to be used, will already have been compensated. In other words, it will be known what setting of the scale 27 on the head 26 of the screw 24 is necessary in order to compensate for the gravity-caused balance error that can be expected to occur when the spring-loaded scale is taken to and operated at a particular location on earth, so that the manufacturer can pre-compensate for this error by appropriate turning of the screw 24.

It will be understood that each of the elements described above, or two or more together, may also find a useful application in other types of constructions differing from the types described above.

While the invention has been illustrated and described as embodied in a mechanical scale, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a gravity compensated spring scale, a combination comprising support means; a balance lever fulcrumed intermediate its ends on said support means and thereby forming a first arm located at one side of the fulcrum and adapted to be connected with a load to be weighed, and a second arm located at the other side of the fulcrum; a biasing spring connected to said other side of said fulcrum; a biasing spring connected to said other side of said fulcrum so as to counter the weight of said load, the force exerted by said biasing spring upon said lever being independent of gravity so that the scale will have indicating errors causing erroneous weight indications for said load at different geographic locations where the force of gravity acts with different magnitude upon the load but does not influence the spring force; means for compensating for gravity comprising a weighted member connected to said other side of said fulcrum and acting to pivotally displace said balance lever in a vertical weighing plane so that measuring errors will occur upon inclining said support means in said vertical weighing plane, and including inclining means for inclining said support means in said vertical weighing plane so that said measuring errors will compensate for said indicating errors of said scale; a level provided on said support means; and adjusting means for adjusting said level in said vertical plane with respect to said support means to a position in which said level indicates apparent horizontality of said support means even though said support means is inclined in said plane to the horizontal to compensate for gravity-caused balance errors.

2. A combination as defined in claim 1, wherein said level comprises a spirit level.

3. A combination as defined in claim 1, wherein said adjusting means comprises a screw.

4. A combination as defined in claim 1, wherein said adjusting means comprises a set screw.

5. A combination as defined in claim 1; and further comprising a scale associated with said adjusting means for indicating different adjusted positions of said level which respectively correspond to different degrees of inclination of said support means.

6. A method of compensating for gravity-caused balance errors in a spring scale comprising the steps of providing support means; fulcruming a balance lever on said support means intermediate its ends so as to form a first arm located on one side of the fulcrum which is adapted to be connected with a load to be weighed, and a second arm located at the other side of the fulcrum; providing a biasing spring and connecting it to said other side of said fulcrum so as to counter the weight of said load, the force exerted by said biasing spring upon said lever being independent of gravity so that the scale will have indicating errors causing erroneous weight indications for said load at different geographic locations where the force of gravity acts with different magnitude upon the load but does not influence the spring force; and compensating for gravity by connecting a weighted member to said other side of said fulcrum so as to pivotally displace said balance lever in a vertical weighing plane so that measuring errors will occur upon inclining said support means in said vertical weighing plane; and incling said support means in said vertical weighing plane so that said measuring errors will compensate for said indicating errors of said scale.

7. A method as defined in claim 6, further comprising the step of providing a spirit level on said support; and further comprising the step of adjusting the inclination of said level until said spirit level provides an indication of apparent horizontality.

* * * * *